US010116831B2

(12) United States Patent
Nakamura

(10) Patent No.: US 10,116,831 B2
(45) Date of Patent: Oct. 30, 2018

(54) MANAGEMENT SERVER CONFIGURED TO EXTRACT INFORMATION INDICATING AN AVAILABILITY OF AN IDENTIFIED IMAGE FORMING APPARATUS, INFORMATION PROCESSING METHOD, SYSTEM AND RECORDING MEDIUM

(71) Applicant: Shuuichi Nakamura, Kanagawa (JP)

(72) Inventor: Shuuichi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/249,949

(22) Filed: Aug. 29, 2016

(65) Prior Publication Data

US 2017/0070639 A1    Mar. 9, 2017

(30) Foreign Application Priority Data

Sep. 3, 2015    (JP) ................................. 2015-174209

(51) Int. Cl.
*H04N 1/32* (2006.01)
*H04N 1/00* (2006.01)
*H04N 1/44* (2006.01)
*H04N 1/23* (2006.01)

(52) U.S. Cl.
CPC ..... *H04N 1/32539* (2013.01); *H04N 1/00344* (2013.01); *H04N 1/00832* (2013.01); *H04N 1/2346* (2013.01); *H04N 1/2361* (2013.01); *H04N 1/4433* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| 9,503,589 | B1* | 11/2016 | Watanabe | G03G 15/5075 |
|---|---|---|---|---|
| 9,710,210 | B2* | 7/2017 | Ban | G06F 3/1273 |
| 2007/0019229 | A1* | 1/2007 | Matsuhara | H04N 1/00832 358/1.15 |
| 2010/0290071 | A1* | 11/2010 | Okada | H04N 1/00244 358/1.13 |

(Continued)

FOREIGN PATENT DOCUMENTS

| JP | 10-333844 | 12/1998 |
|---|---|---|
| JP | 2009-294889 | 12/2009 |

*Primary Examiner* — Miya J Williams
(74) *Attorney, Agent, or Firm* — Harness, Dickey & Pierce, P.L.C.

(57) ABSTRACT

An information processing system includes: an authenticating unit configured to perform an authenticating process based on information on a user of at least one image forming apparatus, the information being transmitted from an information processing apparatus to a server, and identify the at least one image forming apparatus; an extracting unit configured to extract device information including information on availability of the identified at least one image forming apparatus and history information on the identified at least one image forming apparatus; an information output unit configured to output the device information on the identified at least one image forming apparatus to the information processing apparatus; and a display processing unit configured to display the device information transmitted from the information output unit on a display unit.

15 Claims, 8 Drawing Sheets

(56) References Cited

U.S. PATENT DOCUMENTS

| | | | |
|---|---|---|---|
| 2011/0216357 A1* | 9/2011 | Kouno | G06F 3/12 |
| | | | 358/1.15 |
| 2011/0299106 A1* | 12/2011 | Mori | G06F 3/1205 |
| | | | 358/1.9 |
| 2012/0262749 A1* | 10/2012 | Yamamoto | H04N 1/00244 |
| | | | 358/1.14 |
| 2013/0077130 A1* | 3/2013 | Yoshida | G06K 15/02 |
| | | | 358/1.15 |
| 2013/0111045 A1* | 5/2013 | Ichikawa | H04L 67/143 |
| | | | 709/228 |
| 2015/0082457 A1 | 3/2015 | Nakamura et al. | |
| 2015/0277809 A1* | 10/2015 | Kim | G06F 3/126 |
| | | | 358/1.15 |
| 2015/0365481 A1 | 12/2015 | Nakamura | |
| 2017/0068492 A1* | 3/2017 | Nakamura | G06F 3/1212 |
| 2017/0195506 A1* | 7/2017 | Kato | H04N 1/00347 |

* cited by examiner

FIG.10

PRINTER DRIVER

| GENERAL | SHARE | PORT | DETAILED SETTING | COLOR MANAGEMENT | SECURITY | SHEET SIZE | APPLICATION SETTINGS | DEVICES USED IN PAST AND CURRENT STATUS |

LIST OF MULTIFUNCTIONAL PERIPHERALS USED UP TO NOW

| TIME AND DATE OF USAGE | TOTAL USAGE COUNT | DEVICE NAME | IP ADDRESS | CURRENT REACHABILITY |
|---|---|---|---|---|
| 2015/04/03 01:23:45+900 | 234 | DEVICE NAME | 192.168.10.110 | REACHABLE |
| 2015/04/01 12:23:34+900 | 50 | DEVICE NAME | 192.168.10.150 | REACHABLE |
| 2015/03/29 20:44:47+900 | 102 | DEVICE NAME | 192.168.10.120 | REACHABLE |

AVAILABLE ANY TIME

CURRENT STATUS:

| ITEM | CURRENT CONDITION |
|---|---|
| DEVICE CONDITION | NORMAL |
| DETAILED DEVICE CONDITION | IDLE |
| PRINTER CONDITION | AVAILABLE |
| CURRENT ERROR CONDITION | NONE |
| SHEET CONDITION | NORMAL |
| TRAY 1 (A4) | NORMAL |
| TRAY 1 (A3) | NORMAL |
| TONER CONDITION | NORMAL |
| TONER (B) | 57% |
| TONER (C) | 80% |
| TONER (Y) | 92% |
| TONER (M) | 75% |

MANAGEMENT SERVER CONFIGURED TO EXTRACT INFORMATION INDICATING AN AVAILABILITY OF AN IDENTIFIED IMAGE FORMING APPARATUS, INFORMATION PROCESSING METHOD, SYSTEM AND RECORDING MEDIUM

CROSS-REFERENCE TO RELATED APPLICATIONS

The present application claims priority under 35 U.S.C. § 119 to Japanese Patent Application No. 2015-174209, filed Sep. 3, 2015. The contents of which are incorporated herein by reference in their entirety.

BACKGROUND OF THE INVENTION

1. Field of the Invention

The present invention relates to an information processing system, an information processing method, and a recording medium.

2. Description of the Related Art

Recently, a function referred to as location-free printing (hereinafter, referred to as LF printing) has been put into practice. In such LF printing, implemented is a system that uses a dedicated server to centrally manage multifunction peripherals (image forming apparatuses) and user information, so that users can output printouts from any device the user likes, after the user issues a printing instruction from a user personal computer (PC).

The LF printing is a function enabling a user to output a print from any one of a plurality of multifunction peripherals that are connected over a network, without the user designating which multifunction peripheral is to be used to output the print before the user issues the printing instruction from the PC. Even when the device often used by the user is not operating due to some trouble, or is congested, for example, the user can output a print from another available multifunction peripheral. This function of LF printing is known to serve to enable users to make effective use of time, for example.

For example, Japanese Unexamined Patent Application Publication No. 2009-294889 discloses a technique in which a user can output a print from any multifunction peripherals that are connected to a management server having an authentication function over a network, by transmitting the print data from the printer driver on the PC to the management server. This technique makes such printing possible by accumulating the print data transmitted from the user PC on the management server, and by causing a multifunction peripheral to fetch the accumulated data from the management server when the user is to actually output a print.

However, the technique disclosed in Japanese Unexamined Patent Application Publication No. 2009-294889 has a disadvantage that, when a user attempts to designate one of a plurality of multifunction peripherals supporting LF printing, the user is incapable of recognizing the availability of each of the multifunction peripherals accurately, and therefore, it is not possible for the user to select an available multifunction peripheral quickly, and to output a print efficiently.

In other words, while the conventional LF printing has the advantage that the user can output a print from any multifunction peripheral after the user issues a printing instruction from the PC, it is not possible for the user to recognize whether the multifunction peripheral often used by the user is currently in use, or has failed. For example, when there is a multifunction peripheral that supports LF printing on one floor of a building, the user is usually expected to use the multifunction peripheral. There are, however, some cases in which the user finds out that another user is outputting a large amount of prints, or the multifunction peripheral has failed when the user issues the printing instruction and thereafter arrives at the place where the multifunction peripheral is installed. In such a case, the user needs to go through a trouble of looking for another idle and available multifunction peripheral. As a result, the convenience for the user has been lost, and the operation has been inefficient, disadvantageously.

SUMMARY OF THE INVENTION

According to one aspect of the present invention, an information processing system includes an authenticating unit, an extracting unit, an information output unit, and a display processing unit. The authenticating unit is configured to perform an authenticating process based on information on a user of at least one image forming apparatus, the information being transmitted from an information processing apparatus to a server, and identify the at least one image forming apparatus. The extracting unit is configured to extract device information including information on availability of the identified at least one image forming apparatus and history information on the identified at least one image forming apparatus. The information output unit is configured to output the device information on the identified at least one image forming apparatus to the information processing apparatus. The display processing unit is configured to display the device information transmitted from the information output unit on a display unit.

BRIEF DESCRIPTION OF THE DRAWINGS

FIG. 10 is a schematic view for explaining an exemplary GUI screen of the printer driver on the user PC.

Figure 1:
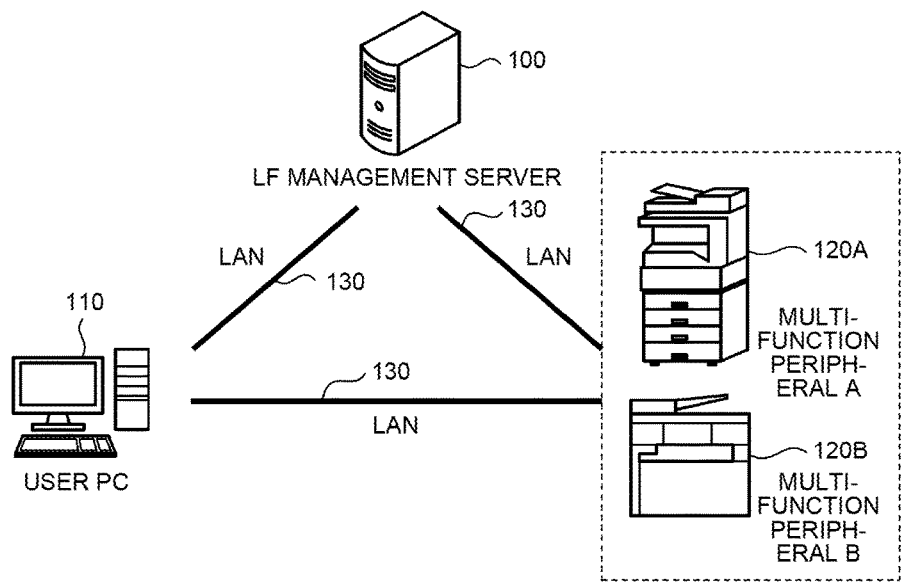
FIG. 1 is a schematic for explaining a system configuration according to an embodiment of the present invention.

The accompanying drawings are intended to depict exemplary embodiments of the present invention and should not

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An information processing system, an information processing method, and a recording medium according to one embodiment of the present invention will now be explained in detail with reference to the appended drawings.

An embodiment has an object to provide an information processing system, an information processing method and a recording medium capable of notifying the availability of image forming apparatuses, and improving the efficiency of LF printing.

Embodiment

In this information processing system, a management server is enabled to keep a tally of information related to a device from which a user has output prints in the past, and to notify a printer driver on a user PC of the information on the device frequently used by the user. The tallying function of the management server acquires and keeps a tally of such information at the timing at which the user actually outputs a print from a multifunction peripheral. The management server updates usage history for a user every time the user outputs a print from a multifunction peripheral. The result tallied by the management server is notified to the printer driver on the user PC, so that the user can view a list of the devices previously used by the user, and the current condition of each of the multifunction peripherals via the printer driver. The information processing system will now be explained using a specific example.

FIG. 1 is a schematic for explaining a system configuration according to the embodiment. As illustrated in FIG. 1, this system has a system configuration in which an LF management server 100, a user PC 110 that is an information processing apparatus, and multifunction peripherals 120A and 120B that are a plurality of printing output devices are connected over a network (LAN) 130, for example. Hereinafter, the user PC 110 will be simply referred to as a PC 110, and the multifunction peripherals 120A and 120B will be simply referred to multifunction peripherals 120, except for the part where there is concern for confusion. In FIG. 1, the multifunction peripherals 120 are illustrated to be two for the purpose of explanation, but the number of multifunction peripherals 120 is not limited to two. Furthermore, the PC 110 is also connected in plurality.

The LF management server 100 is a server for managing LF printing and having a user authentication function. The authentication function is a centrally managed authentication system that uses the authentication information used when the user logs into the own PC 110. Once the LF management server 100 confirms a match of the authentication information with the authentication information entered to the multifunction peripheral 120, the multifunction peripheral 120 is enabled to fetch a printing request issued by the user. The user can output a print from the multifunction peripheral 120 based on the printing request fetched by the multifunction peripheral 120. This function allows a user to output a print from any one of the multifunction peripherals 120.

The LF management server 100 has a function of managing the information on the multifunction peripherals 120 from which users actually output prints, as a history. The LF management server 100 identifies the multifunction peripheral 120 from which a print is output at the timing at which the user logs into the multifunction peripheral 120, and the printing request accumulated in the LF management server 100 is fetched. In this manner, the LF management server 100 can manage the multifunction peripheral 120 used by the user and the usage count.

Once a print is output from the multifunction peripheral 120, the LF management server 100 can also receive the printing conditions used in printing. In this manner, the LF management server 100 can count usage ratios regarding, for example, conditions used when the user outputs a print, in addition to the information related to the multifunction peripheral 120 used by the user.

The LF management server 100 can acquire the management information base (MIB) information from the multifunction peripherals 120, and notify the user's PC 110 of the information at any timing instructed via the user PC 110. Thereby, the user can recognize the current conditions of the multifunction peripherals 120 previously used by the user, on the user's PC 110. The MIB information is data that can be accessed via a network management protocol (Simple Network Management Protocol (SNMP)), and is defined in standard specifications represented by Request for Comments (RFC) 3805. The LF management server 100 can acquire various types of condition information such as the status of each of the multifunction peripherals 120 by acquiring the MIB information from the corresponding multifunction peripheral 120 over the network 130. In this example, this MIB information is explained as an example of the condition information on the exemplary multifunction peripheral 120.

A printer driver supporting LF printing is installed on the PC 110, and the user transmits print data (in the page description language (PDL) format) to the LF management server 100 via the printer driver. The user logs into the PC, and issues a printing instruction to the printer driver from Microsoft Word, for example. The printer driver converts the print data into a data format (such as the PDL format) that can be interpreted by the multifunction peripheral 120, and transmits the print data to the LF management server 100.

The printer driver can acquire information on the devices previously used by the user from the LF management server 100. The device information is information for identifying a device such as an IP address or a MAC address, corresponding to each of the multifunction peripherals 120 previously used by the user. The printer driver can acquire such device information at a timing designated by the user.

The device information provides device identification information such as an IP address of the multifunction peripheral 120 that is frequently used by the user, and the current condition of the device, and these pieces of information can be displayed on a screen (graphical user interface (GUI)) of the printer driver. The determination as to whether a device is frequently used by the user is calculated based on the usage count and the last usage time, among the pieces of information included in the usage history accumulated in the LF management server 100. In this manner, the user can recognize the current condition of the multifunction peripheral 120 frequently used by the user, and the conditions of the other multifunction peripherals 120.

For the communication between the multifunction peripheral 120 and the LF management server 100, used is a Web-based application programming interface (API) (Web application) using a general-purpose protocol such as Hypertext Transfer Protocol (HTTP), and a data structure using a general-purpose format such as Extensible Markup Language (XML). The user can view a list of the devices previously used by the user via the screen (GUI) of the printer driver, and sort the data in an order of the usage count or the last usage time, for example.

When the user selects a particular multifunction peripheral 120 on the GUI, the printer driver can acquire the MIB information in the multifunction peripheral 120 over the network 130 at the timing at which such a selection is made, and notify the user of the condition of the multifunction peripheral 120. The MIB information is data that can be accessed by a network management protocol (SNMP), and is defined in standard specifications represented by RFC 3805. The printer driver can acquire various types of information such as the condition of the multifunction peripheral 120 by acquiring the MIB information in the multifunction peripheral 120 over the network 130.

The multifunction peripherals 120A and 120B are multifunction peripherals that are centrally managed by the LF management server 100, and the multifunction peripherals 120 can fetch user print data from the LF management server 100. A user transmits print data to the LF management server 100 from the own PC 110. In this process, the LF management server 100 accumulates the print data received from the user PC 110 in a manner linked to the user information. At the timing at which the user logs into a multifunction peripheral 120, a list of the accumulated print data is acquired using the user information (user ID) as a key. The multifunction peripheral 120 displays the acquired list as a list of printable data on an operation panel (not illustrated), so that the user can output a print by selecting the required data from the list of printable data.

The multifunction peripherals 120 also support a network management protocol (SNMP) referred to as management information base (MIB), and the user can check the conditions of the multifunction peripherals 120 from the PC 110 using a dedicated application, for example. A possible common operation is to install the dedicated application on the management server, so that the management server can centrally manage each of the devices, but it is also possible to acquire the MIB information from a general-purpose personal computer (PC) over the network 130.

Figure 2:
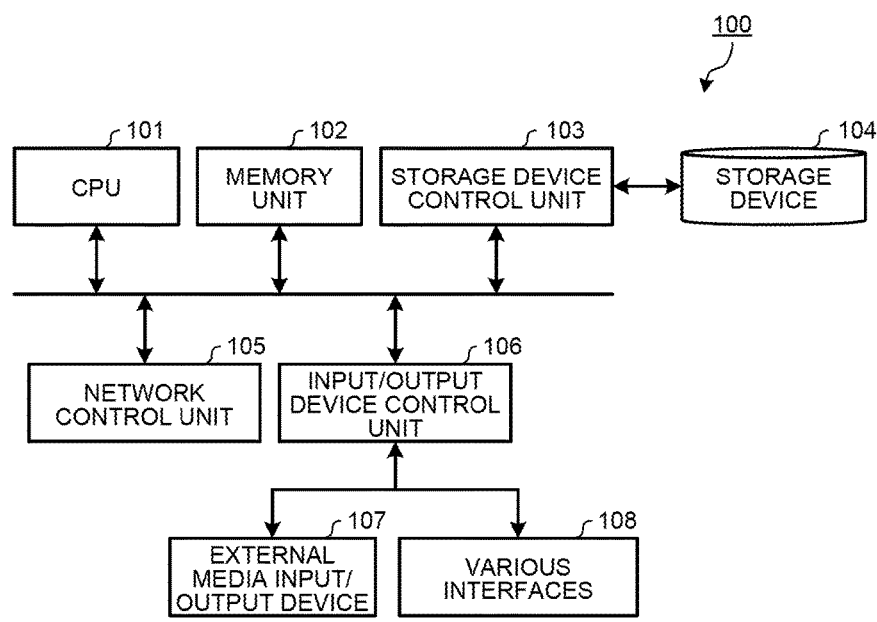
FIG. 2 is a block diagram illustrating a hardware configuration of an LF management server.

FIG. 2 is a block diagram illustrating a hardware configuration of the LF management server 100. In the LF management server 100, a central processing unit (CPU) 101, a memory unit 102, a storage device control unit 103, a network control unit 105, and an input/output device control unit 106 are connected via a bus. To the storage device control unit 103, a storage device 104 is connected. To the input/output device control unit 106, an external media input/output device 107 and various interfaces 108 are connected.

The CPU 101 controls various devices, and performs operations and processing on data. The CPU 101 is a processor executing a computer program stored in a main memory. The CPU 101 receives data from an input device or a storage device, performs operations and processing, and outputs the resultant data to an output device or a storage device.

Examples of the memory unit 102 include a read-only memory (ROM) and a random access memory (RAM). The memory unit 102 is a storage device for storing or temporarily retaining therein an operating system (OS) which is the basic software executed by the processor, computer programs such as application software, and data, for example.

The storage device control unit 103 performs control for connecting a storage device 104 such as a hard disk drive (HDD), and for storing data that is related to application software, for example. The storage device 104 stores therein various types of information (such as user information), and is managed through functions of a database or a file system, for example.

The network control unit 105 is an Ethernet (registered trademark) controller, for example, and has a function of communicating with other computers via a local area network (LAN) or a wide area network (WAN). The input/output device control unit 106 manages the external media input/output device 107 and the various interface devices 108, and inputs and outputs data from and to external devices.

The external media input/output device 107 controls external media such as a USB medium, CompactFlash (CF) (registered trademark), and a secured digital (SD) card to input and output data. The various interfaces 108 are interfaces such as a serial port, a USB port, and an IEEE 1394 port for connecting external devices. General-purpose input/output devices can be used via these various interfaces.

Figure 3:
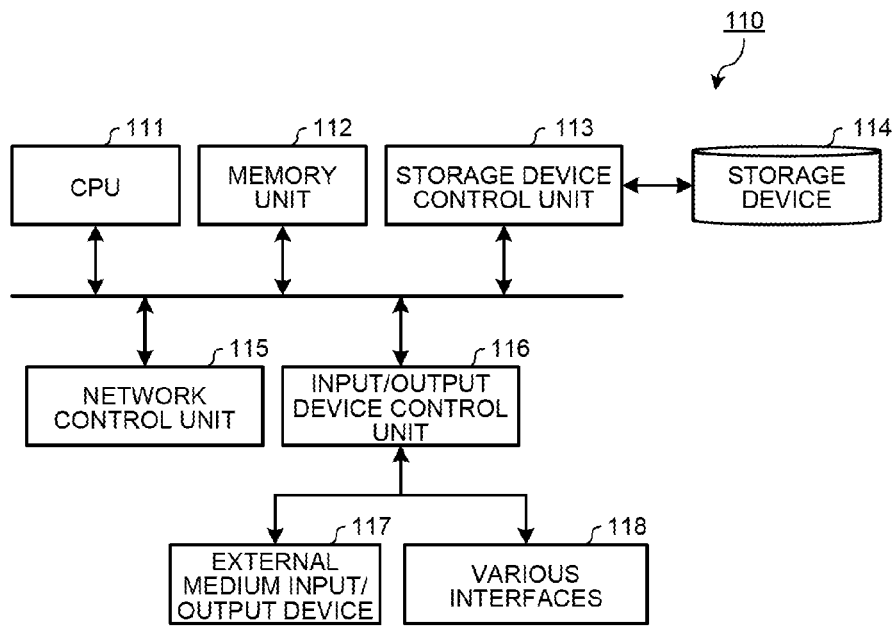
FIG. 3 is a block diagram illustrating a hardware configuration of a PC.

FIG. 3 is a block diagram illustrating a hardware configuration of the PC 110. In the PC 110, a CPU 111, a memory unit 112, a storage device control unit 113, a network control unit 115, and an input/output device control unit 116 are connected via a bus. To the storage device control unit 113, a storage device 114 is connected. To the input/output device control unit 116, an external medium input/output device 117 and various interfaces 118 are connected.

The CPU 111 controls various devices, and performs operations and processing on data. The CPU 111 is a processor executing a computer program stored in a main memory. The CPU 111 receives data from an input device or a storage device, performs operations and processing, and outputs the resultant data to an output device or a storage device.

Examples of the memory unit 112 include a ROM and a RAM. The memory unit 112 is a storage device for storing or temporarily retaining therein an OS, which is the basic software executed by the processor, computer programs such as application software, and data, for example.

The storage device control unit 113 performs control for connecting the storage device 114 such as a HDD, and for storing data related to application software, for example. The storage device 114 stores therein various types of information (such as user information), and is managed through functions of a database or a file system, for example.

The network control unit 115 is an Ethernet controller, for example, and has a function of communicating with other computers over a LAN or a WAN. The input/output device control unit 116 manages the external medium input/output device 117 and various interface devices 118, and inputs and outputs data from and to external devices.

The external medium input/output device 117 controls external media such as a USB medium, a CF, and an SD card, and inputs and outputs data. The various interfaces 118 are interfaces such as a serial port, a USB port, and an IEEE 1394 port for connecting external devices. General-purpose input/output devices can be used via the various interfaces.

Figure 4:
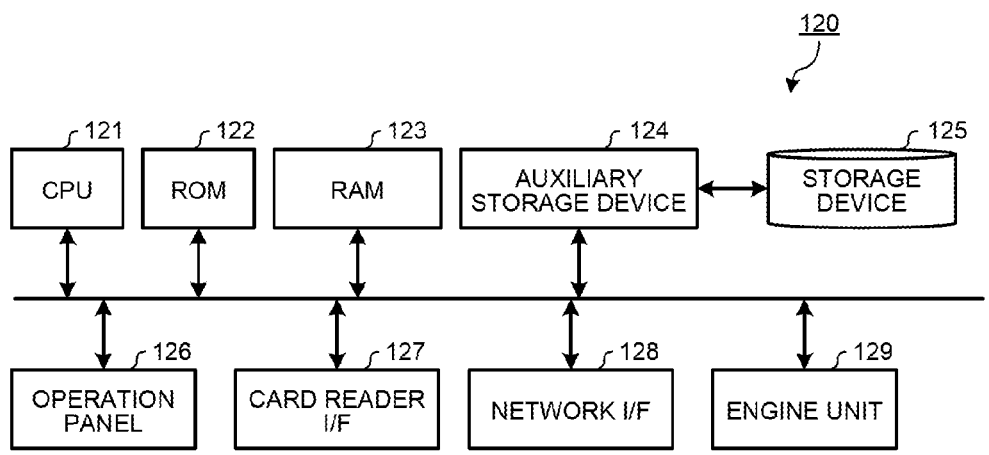
FIG. 4 is a block diagram illustrating a hardware configuration of a multifunction peripheral.

FIG. 4 is a block diagram illustrating a hardware configuration of the multifunction peripheral 120. In the multifunction peripheral 120, a CPU 121, a ROM 122, a RAM 123, an auxiliary storage device 124, an operation panel 126, a card reader interface (I/F) 127, a network I/F 128, and an engine unit 129 are connected via a bus. To the auxiliary storage device 124, a storage device 125 is further connected.

The CPU 121 executes various computer programs for controlling the multifunction peripheral 120. The ROM 122 and the RAM 123 are storage media temporarily storing therein computer programs and data while the multifunction peripheral 120 is operating. Such computer programs and data are loaded from the auxiliary storage device 124 at the time at which the multifunction peripheral 120 is started.

The auxiliary storage device 124 is a storage medium such as a HDD for storing therein computer programs and data. The auxiliary storage device 124 stores therein data generated by printing, scanning, and facsimile.

The operation panel 126 receives settings for a job, a request for executing a job, a request for executing a maintenance operation, and other requests via user operations. Examples of the operation panel 126 include a liquid crystal display and an organic electroluminescent (EL) display. The operation panel 126 also displays various screens such as an operation screen for performing settings, and messages to the user, for example.

The card reader I/F 127 is a device capable of reading user information from an integrated circuit (IC) card of a user contactlessly. The card reader I/F 127 is mainly used when a user logs into the multifunction peripheral 120. When a user does not use an IC card to log in, the user can log into the multifunction peripheral 120 by entering the user information via the operation panel 126, for example.

The network I/F 128 is an Ethernet controller, for example, and communicates with other computers over a LAN or a WAN.

The engine unit 129 controls an engine such as a plotter and a scanner, and executes a printing operation or a scanning operation.

Figure 5:
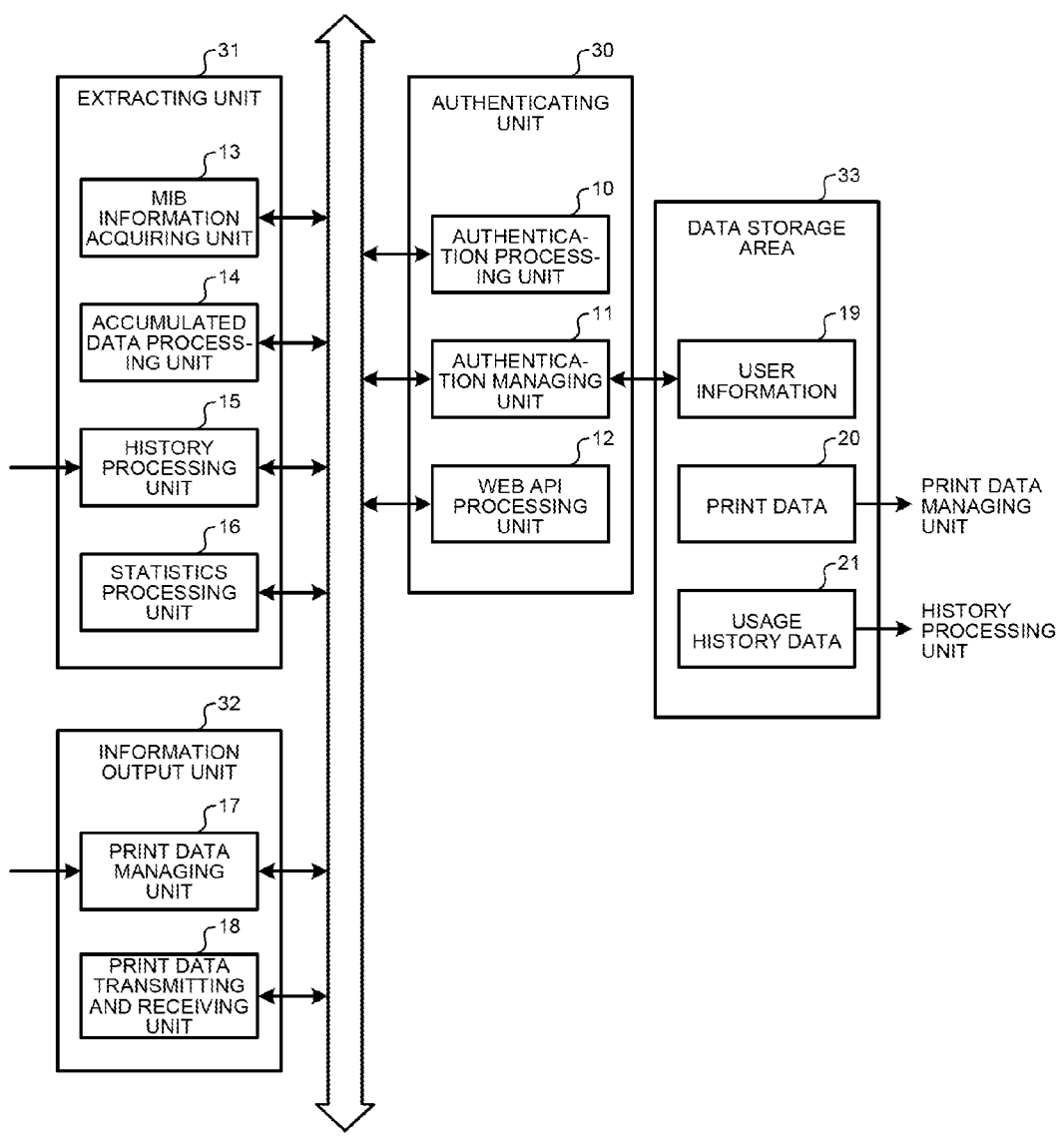
FIG. 5 is a block diagram illustrating a software functional configuration of the LF management server.

FIG. 5 is a block diagram illustrating a software functional configuration of the LF management server 100. An authenticating unit 30 has functions of an authentication processing unit 10, an authentication managing unit 11, and a Web API processing unit 12. An extracting unit 31 includes functions of an MIB information acquiring unit 13, an accumulated data processing unit 14, a history processing unit 15, and a statistics processing unit 16. An information output unit 32 includes functions of a print data managing unit 17 and a print data transmitting and receiving unit 18.

The authentication processing unit 10 is a processing unit that governs user authentication such as log-in and log-out, and is used together with the authentication managing unit managing the user information. In the LF environment, the authentication of the user logging into the own PC 110 is mainly performed by an authentication server. The LF management server 100 also serves as this authentication server, and can manage the authentication via the user PC 110 and the authentication via the multifunction peripheral 120 (in a configuration in which a user enters a user ID or the like to log in) as the same session. Therefore, when a user issues a printing instruction from the own PC 110, the same print data can be shared with the multifunction peripheral 120 into which the same user logs.

The authentication managing unit 11 manages the user information, and is used together with the authentication processing unit 10.

The Web API processing unit 12 is a processing unit for communicating with the printer driver on the PC 110, and this communication is implemented using a general-purpose protocol such as HTTP(S). A general-purpose format such as Extensible Markup Language (XML) is used as the data format, so that the data will not be platform-dependent.

The MIB information acquiring unit 13 acquires the MIB information from the top three multifunction peripherals 120, for example, over the network 130, among multifunction peripherals in the list calculated by the statistics processing unit 16. Because the original data includes information such as an IP address for identifying a multifunction peripheral 120, the MIB information acquiring unit 13 accesses a multifunction peripheral 120 based on the IP address, and acquires the MIB information. If the MIB information acquiring unit 13 is to access the multifunction peripherals 120 before the LF management server 100 establishes a communication with the user PC 110, the load in the network 130 would be increased. Therefore, such an access is made as a background process only when such an access is requested by the printer driver on the user PC 110.

The accumulated data processing unit 14 is a processing unit that is used when accumulation of data is requested by the printer driver on the PC 110.

The history processing unit 15 is a processing unit that makes the information on the multifunction peripheral 120 used in outputting a print by the user persistent, and managing such information as usage history data.

The statistics processing unit 16 generates a list of the multifunction peripherals 120 having been used by the user from the past up to now, based on the history data acquired by the history processing unit 15, and extracts the multifunction peripheral 120 having been used most recently and having the highest usage count. The last usage time as well as the usage count is considered because there is a possibility for the multifunction peripherals 120 in a company to be replaced regularly. In this manner, a list of multifunction peripherals that are frequently used by the user can be calculated.

The print data managing unit 17 is a managing unit that accumulates the print data generated by the printer driver on the PC 110, and stores the data mainly in a storage for data storage. Once the data is fetched by the print data transmitting and receiving unit 18, and a print is successfully output, such print data is deleted from the storage for data storage, so that storage area will be made available again.

The print data transmitting and receiving unit 18 is a processing unit that receives the print data generated by the printer driver on the PC 110, and transmits the print data to the multifunction peripheral 120 when there is a request from the multifunction peripheral 120.

In the data storage area 33 of the LF management server 100, user information 19, print data 20, and usage history data 21 are stored. Content of these pieces of data are described in Tables 1-1 to 1-5 below.

A part or the whole of the functional configurations of the LF management server 100 may be implemented as hardware.

The authenticating unit 30 authenticates a multifunction peripheral 120 based on the user information on the multifunction peripheral 120 transmitted from the PC 110 to the LF management server 100, and identifies the multifunction peripheral 120. The extracting unit 31 extracts device information including information related to the availability of the identified multifunction peripheral 120 and history information. The information output unit 32 outputs the device information corresponding to the identified multifunction peripheral 120 to the PC 110. The display processing unit (GUI processing unit 43, see FIG. 6) then displays the device information received from the information output unit 32 on the display unit.

In this manner, the extracting unit 31 in the LF management server 100 receiving a printing request from the PC 110 (printer driver) extracts information related to print outputs performed by the user in the past (such as the IP address of the device from which a print is output, and the printing conditions). In this manner, the information on the device designated by the user can be acquired directly, and the conditions of the device (such as another user now printing) can be notified in advance via the printer driver.

The extracting unit 31 includes a history processing unit 15. The history processing unit 15 merges history information accumulated for a multifunction peripheral 120 with the history information having already been accumulated so as not to be redundant with each other. In this process, if the time period from when the history information was acquired last time and to now is equal to or longer than a predetermined time period, the history processing unit 15 partitions and divides the history information in units of the predetermined period before the history information is acquired.

The extracting unit 31 also includes a statistics processing unit 16 that extracts a list of image forming apparatuses having been most frequently used from the past to now, based on the user usage history extracted by the history processing unit 15.

When the LF management server 100 receives a printing request after the printing is requested, the extracting unit 31 acquires the MIB information indicating the conditions of the multifunction peripherals 120 sequentially from the top of the list of the multifunction peripherals 120 extracted by the statistics processing unit 16 and acquire the current device information on the multifunction peripherals 120.

The history processing unit 15 records additional history information corresponding to the user to the history information on the LF management server 100, at the timing at which the user outputs a print from a particular multifunction peripheral 120, and so that the history information can be retrieved using at least one of a user name, date and time, a device name, and a device reachability status.

The statistics processing unit 16 extracts a list of multifunction peripherals 120 having been used most frequently from the past to now, based on the user history information extracted by the history processing unit 15, and extracts only the device information on multifunction peripherals 120 that are reachable, sequentially from the top of the list.

In this manner, the user can acquire the current information on the most frequently used multifunction peripheral 120 from the top of the list of the multifunction peripherals 120 extracted by the history processing unit 15 and the statistics processing unit 16, and display the current information on the GUI screen of the printer driver.

Furthermore, because the usage history of the entire users is accumulated in the LF management server 100, user history can be searched quickly later in time, by tagging.

Furthermore, not only can the statistical processing be performed based on the history information, but also only the multifunction peripherals 120 that are currently reachable (available) can be extracted from the list of the multifunction peripherals 120 having been extracted.

Figure 6:
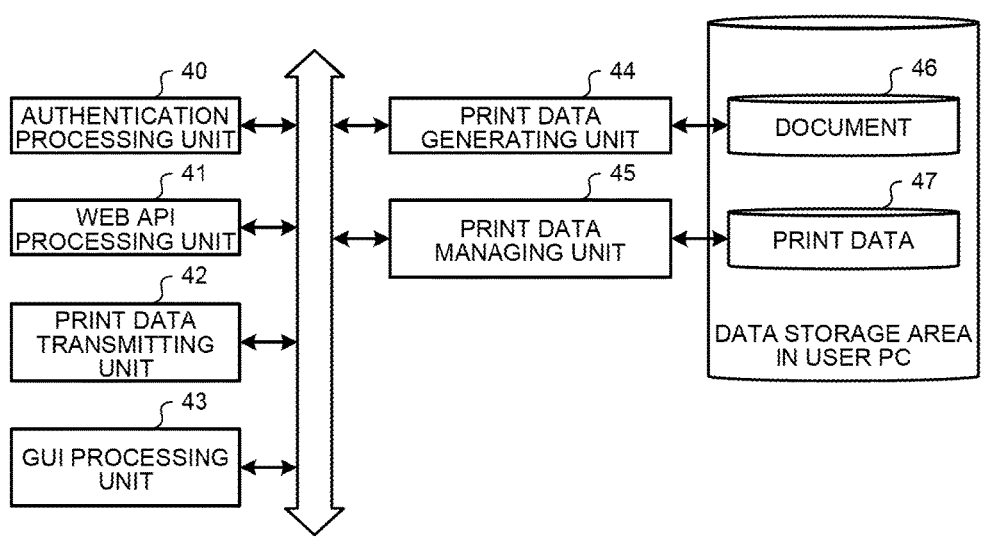
FIG. 6 is a block diagram illustrating a software functional configuration of a printer driver on the PC.

FIG. 6 is a block diagram illustrating a software functional configuration of the printer driver on the PC 110.

A part or the whole of the functional configurations of the printer driver on the PC 110 may be implemented as hardware.

An authentication processing unit 40 is a processing unit that performs a user authentication to the authentication processing unit 10 in the LF management server 100 based on the session information on the time at which the user logs into the own PC 110. The authentication processing unit 40 can also handle the session at the time when the user logs into the multifunction peripheral 120 integrally. Thereby, an authentication system referred to as an integrated authentication system or a single sign-on is constructed. With such a system, a user can be handled as the same user as long as the user logs into the network with centrally managed user information and an authentication system implemented, using the same account information.

A Web API processing unit 41 is a processing unit that governs the communication with the LF management server 100, and is used in acquiring the usage history accumulated in the LF management server 100. The usage history of the entire users from the past to now is being accumulated in the LF management server 100, and the Web API processing unit 41 can request the usage history via general-purpose protocols such as HTTP(S).

A print data transmitting unit 42 is a processing unit that transmits print data created by the printer driver to the LF management server 100.

A GUI processing unit 43 processes the GUI screen of the printer driver. The GUI screen can operate interactively with a user, and also accepts requests from the user. The GUI processing unit 43 can specify setting such as printing settings for the printer, and conditions for the finisher (sheet post-processing apparatus) performing binding, punching, sorting, and the like. The GUI processing unit 43 can also display a list of multifunction peripherals 120 previously used by the user, and detailed information on a multifunction peripheral 120 selected by the user. The printer driver communicates with the LF management server 100 to acquire the list of multifunction peripherals 120 previously used by the user, and acquires the information on a specific multifunction peripheral 120 based on the acquired information. The information on the multifunction peripheral 120 corresponds to the MIB information, and is acquired by the MIB information processing unit 13.

A print data generating unit 44 generates print data of a document designated by the user. Examples of the document include a text file, a file created on MS Word (registered trademark), and an image file. The print data is data in the PDL format that can be interpreted by the multifunction peripheral (printer) 120, and data associated thereto. The generated print data is transmitted to the LF management server 100. While the data is being created, or immediately before the data is transmitted over the network 130, the print data is stored temporarily in a storage area.

A print data managing unit 45 manages the print data created by the print data generating unit 44. Because the print data generating unit 44 generates a piece of print data for each document or each page of a document, the print data managing unit 45 manages a set of pieces of print data when a user requests printing of a plurality of documents.

A document 46 and print data 47 are stored in the data storage area of the PC 110.

Figure 7:
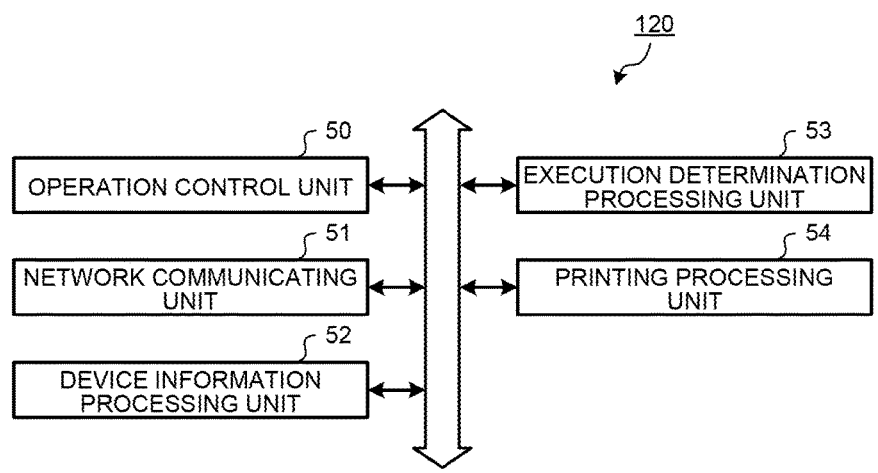
FIG. 7 is a block diagram illustrating a software functional configuration of the multifunction peripheral.

FIG. 7 is a block diagram illustrating a software functional configuration of the multifunction peripheral 120. An operation control unit 50 is a GUI that displays an operation screen for allowing the user to make operations on the operation panel 126, and receives inputs from the user. The operation control unit 50 also receives a request for causing the multifunction peripheral 120 to execute a job via a user operation.

A network communicating unit 51 communicates with external computers over the network 130, and communicates with the user PC 110 and the LF management server 100. The network communicating unit 51 also receives a request to acquire MIB information from the user PC 110 or the LF management server 100 over the network management protocol (SNMP). Once the request to acquire the MIB information is received, the network communicating unit 51 returns the information collected by the device information processing unit 52 to the requestor.

A device information processing unit 52 is a processing unit that regularly keeps a tally and accumulates various types of information related to the multifunction peripheral 120. As the various types of information, the device information processing unit 52 manages the conditions of sheets or toner in the multifunction peripheral 120, an online or offline status of the device, a status such as a transition to or resume from an energy-saving mode, and a comprehensive condition representative of the multifunction peripheral 120 based on comprehensive determination of these conditions. The device information processing unit 52 makes a diagnosis on such conditions regularly (e.g., one minute or so), and manages these conditions as the conditions of the multifunction peripheral 120. The device information processing unit 52 also sometimes acquires these conditions in response to a request from an external computer, for example.

An execution determination processing unit 53 determines whether a job requested via the operation control unit 50 or over the network 130 can be executed, considering the conditions of consumable printing supplies, e.g., the remaining number of sheet and the toner conditions.

A printing processing unit 54 is a processing unit that executes printing in response to a job requested via the operation control unit 50 or over the network 130. For example, in a job requested via the operation panel 126, the printing processing unit 54 causes the scanner to read a document to acquire print data or selects print data accumulated in advance to output a print.

The information related to the LF management server 100, the PC 110, the multifunction peripheral 120 will now be explained. Table 1-1 is a table representing the history of usage by the entire users and the device information managed by the LF management server 100. In this table, information on the usage time and date the multifunction peripheral 120 from which a print is output for each user, and thereby which user has used which device at what point in time can be determined. This table is updated when a user issues a printing request from the own PC 110, and a request for accumulating print data from the LF management server 100 is generated. This table is also updated at the timing at which a user outputs a print from a particular multifunction peripheral 120.

Table 1-2 is a table indicating the current conditions of the multifunction peripherals 120. This table manages reachability information on the devices having been used by a user. This table is updated at the timing at which the user PC 110 outputs a print, as mentioned earlier, and at predetermined timing, e.g., at a regular interval (e.g., one o'clock every night). The reachability status mainly takes one of two values of either reachable or unreachable, and only the information on reachable devices is sent to the printer driver as the history information. In this manner, packets sent across the network 130 can be reduced, so that the load in the network 130 can be reduced.

The data stored in the table illustrated in Table 1-2 mainly includes the status indicating as to whether a multifunction peripheral 120 is reachable, the time and date at which the information is updated, and the IP address identifying the multifunction peripheral 120. The data for the same device is overwritten with new data when such a device becomes unreachable due to causes such as a change in the IP address to avoid redundancy. When an unreachable status persists, the time and date of an update is kept unupdated.

Table 1-3 represents user usage history managed by the LF management server 100. This information is history information on users who output prints from the multifunction peripherals 120, and the LF management server 100 accumulates the usage history for the entire users in the past. This usage history is updated as a list presenting the names and the IP addresses of the multifunction peripherals 120 having been used by the user, and the time and date at which the respective multifunction peripherals 120 are used, and kept as permanent data in the storage area of the LF management server 100, for example.

Table 1-4 is a table presenting the result of statistics calculation that is based on the history data persistently stored in the LF management server 100, and presents a tally of the usage count of each one of the specific devices based on the usage history from when persistent storing of the history data has been started to now. If a device has a high usage count and the time and the date of the last usage is recent, the device can be recognized as a device frequently used by the user.

Table 1-5 is a table representing an extraction of the tallied data represented in Table 1-4 extracted for a specific user, sorted in the descending order of the usage ratio. With this information, it can be determined that the user uses the multifunction peripherals 120 more frequently from the top of this table. In this process, because there is a possibility for a multifunction peripheral 120 not to be able to establish a connection with the network, due to causes such as the IP address being different from the previous one, a simple reachability test that uses a packet internet groper (ping) command, for example, is performed before this table is updated, and any unreachable device is excluded from this table. This exclusion is a process performed to ensure that no device is registered with a plurality of IP addresses, or no IP address is registered with a plurality of multifunction peripherals 120.

TABLE 1-1

| | Time and date of usage | User name | Output device |
|---|---|---|---|
| 1 | 2015/04/03 01:23:45 + 0900 | user 1 | deviceID_0123 |
| 2 | 2015/04/02 23:45:12 + 0900 | user 2 | deviceID_0234 |
| 3 | 2015/04/01 12:23:34 + 0900 | user 1 | deviceID_0123 |
| 4 | 2015/03/30 03:56:22 + 0900 | user 3 | deviceID_0345 |
| 5 | 2015/03/29 20:44:47 + 0900 | user 1 | deviceID_0123 |

TABLE 1-2

| | Multifunctional peripheral | Information update time and date | Reachability status | IP address |
|---|---|---|---|---|
| 1 | deviceID_0123 | 2015/06/01 01:00:00 + 0900 | Reachable | 192.168.10.110 |
| 2 | deviceID_0234 | 2015/06/01 01:00:00 + 0900 | Reachable | 192.168.10.150 |

TABLE 1-2-continued

|   | Multifunctional peripheral | Information update time and date | Reachability status | IP address |
|---|---|---|---|---|
| 3 | deviceID_0345 | 2014/12/30 01:00:00 + 0900 | Unreachable | 192.168.10.115 |
| 4 | deviceID_0456 | 2015/06/01 01:00:00 + 0900 | Reachable | 192.168.10.120 |
| 5 | deviceID_0567 | 2014/10/20 01:00:00 + 0900 | Unreachable | 192.168.10.135 |

TABLE 1-3

|   | Output device | Time and date of last usage | Usage count |
|---|---|---|---|
| 1 | deviceID_0123 | 2015/04/03 01:23:45 + 0900 | 234 |
| 2 | deviceID_0234 | 2015/02/13 08:45:12 + 0900 | 50 |
| 3 | deviceID_0345 | 2014/12/20 12:23:34 + 0900 | 423 |
| 4 | deviceID_0456 | 2015/11/09 03:56:22 + 0900 | 102 |
| 5 | deviceID_0567 | 2014/08/11 20:44:47 + 0900 | 23 |

TABLE 1-4

|   | Output device | Time and date of last usage | Usage count | IP address |
|---|---|---|---|---|
| 1 | deviceID_0123 | 2015/04/03 01:23:45 + 0900 | 234 | 192.168.10.110 |
| 2 | deviceID_0234 | 2015/02/13 08:45:12 + 0900 | 50 | 192.168.10.150 |
| 3 | deviceID_0456 | 2015/11/09 03:56:22 + 0900 | 102 | 192.168.10.135 |

TABLE 1-5

|   | Item | Condition |
|---|---|---|
| 1 | Device condition | Normal |
| 2 | Detailed device condition | Idle |
| 3 | Printer condition | Available |
| 4 | Current error condition | None |
| 5 | Sheet condition | Normal |
| 6 | Tray 1 (A4) | Normal |
| 7 | Tray 2 (A3) | Normal |
| 8 | Toner condition | Normal |
| 9 | Toner (B) | 57% |
| 10 | Toner (C) | 80% |
| 11 | Toner (Y) | 92% |
| 12 | Toner (M) | 75% |
|   | ... | ... |

Table 2-1 is a table presenting the MIB information acquired from a specific multifunction peripheral 120. This table presents the current conditions of the multifunction peripheral 120 (e.g., available, now printing, failed, out-of-sheet, and toner nearly out), and the LF management server 100 can recognize which multifunction peripheral is idle based on this information. This table is updated by the MIB information being acquired from the multifunction peripheral 120 at the timing at which a user selects that particular multifunction peripheral from the usage history in the GUI screen of the printer driver. This table is updated at a preset interval (e.g., one minute subsequent to a startup, and subsequently in the increment of one minute), and from the top to the bottom of the list having been extracted via the statistical processing.

Table 2-2 to 2-7 presents representative MIB information retained by the multifunction peripheral 120. The multifunction peripheral 120 has an MIB function enabling such current conditions to be acquired over the network 130, and can be accessed via the network management protocol (SNMP). With the MIB information referred to as Printer MIB v2, in particular, the information specific to the multifunction peripheral 120 can be acquired in a database format. By acquiring this data, the LF management server 100 can determine the current conditions of the multifunction peripheral 120.

TABLE 2-1

|   | Comprehensive printer condition | Device condition | Printer condition |
|---|---|---|---|
| 1 | Idle | Normal | Available |
| 2 | Currently in use/active | Normal | Printing |
| 3 | Non-critical alert | Alert | Idle or printing |
| 4 | Critical alert | Unusable | Unknown |
| 5 | Unavailable | Unusable | Unknown |
| 6 | Transiting to off-line | Alert | Idle or printing |
| 7 | Off-line | Unusable | Others |
| 8 | Transiting to on-line | Unusable | Warming up |
| 9 | Stand-by | Normal | Others |

TABLE 2-2

|   | Error condition |
|---|---|
| 1 | Nearly short of sheet |
| 2 | Short of sheet |
| 3 | Nearly short of toner |
| 4 | Short of toner |
| 5 | Door open |
| 6 | Paper jam |
| 7 | Off-lined |
| 8 | Request for service |
| 9 | No sheet-feeding tray |
| 10 | No sheet-discharge tray |
| 11 | Short of drawing consumable |
| 12 | Sheet-discharge bin nearly full |
| 13 | Sheet-discharge bin full |
| 14 | Sheet-feeding tray empty |
| 15 | Maintenance for expiration prevention |

TABLE 2-3

|   | Availability status |
|---|---|
| 1 | Available and idle |
| 2 | Available and standby |
| 3 | Available and active |
| 4 | Available and currently in use |
| 5 | Available and receiving request |
| 6 | Unavailable due to failure |
| 7 | Unknown |

TABLE 2-4

|   | Non-critical alert |
|---|---|
| 1 | Non-critical alert off |
| 2 | Non-critical alert on |

TABLE 2-5

|   | Critical alert |
|---|---|
| 1 | Critical alert off |
| 2 | Critical alert on |

TABLE 2-6

| | On-line |
|---|---|
| 1 | On-line |
| 2 | Off-line |

TABLE 2-7

| | Transition |
|---|---|
| 1 | Currently in mode |
| 2 | Currently transiting to mode |

Figure 8:
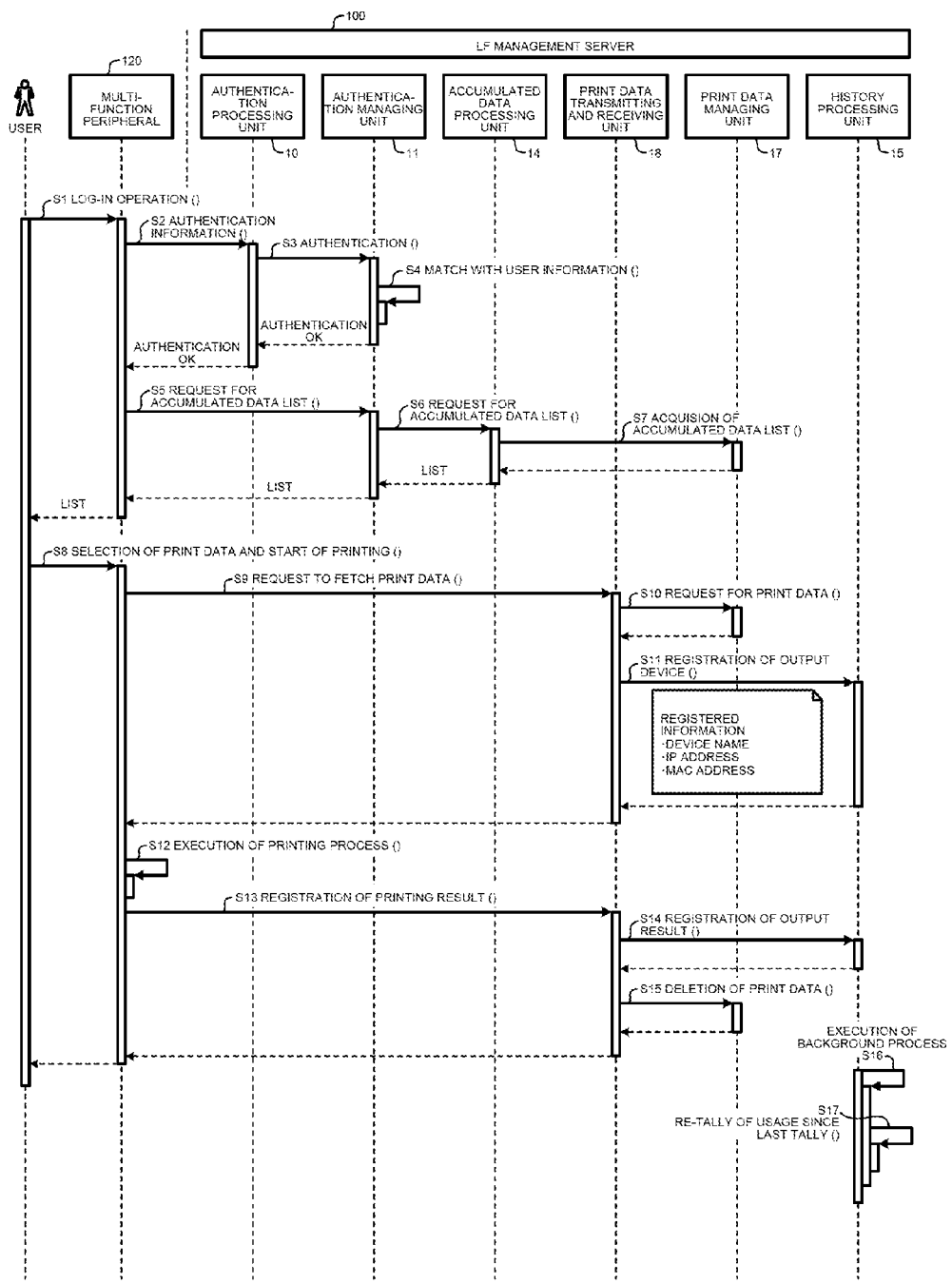
FIG. 8 is a sequence chart illustrating the sequence of a process in which history information is accumulated on the LF management server when the user outputs a print from the multifunction peripheral.

A process of outputting a print, a process of requesting printing, and a process of acquiring device information will now be explained. FIG. 8 is a sequence chart illustrating the sequence of a process in which the LF management server 100 accumulates the history information at the timing at which the user outputs a print from a multifunction peripheral 120.

In FIG. 8, to begin with, a user operates the operation panel 126 on the multifunction peripheral 120 to log into the multifunction peripheral 120 (Step S1). To log in, the user uses the ID having been set in advance on the operation panel 126, or the IC card embedded with information for identifying the user. When the log-in is executed, the multifunction peripheral 120 generates an inquiry addressed to the LF management server 100 serving as an authentication server (Step S2). The user information is centrally managed on the LF management server 100. An inquiry addressed to the authentication server (the LF management server 100) is also generated when the user logs into the PC 110, in the same manner as when the user logs into the multifunction peripheral 120 (Step S3).

Upon receiving the log-in request from a client (the multifunction peripheral 120 or the PC 110), the LF management server 100 causes the processing unit governing the authentication function to authenticate, and matches the received user information with the centrally managed user information. If the match succeeds, a log-in state is achieved (Step S4).

When the user transits to the log-in state, the user can now acquire a list of print data accumulated in the LF management server 100 (Steps S5 to S7). This list will present the user with the print data having been received from the user PC 110 in advance but not having been printed yet. Upon receiving the list of the accumulated data corresponding to the user having logged into the multifunction peripheral 120, the multifunction peripheral 120 displays the list as a list of printable data on the operation panel 126. The user is allowed to delete some data from the list, because the user may no longer need to print the data in some cases.

Once the user selects some data to be printed on the operation panel 126 of the multifunction peripheral 120 and starts printing, the multifunction peripheral 120 is permitted to acquire the print data on the list from the LF management server 100, one piece at a time, and starts executing printing (Steps S8 to S10). When the multifunction peripheral 120 fetches a piece of the print data, the LF management server 100 registers therein the multifunction peripheral 120 as a device from which the user outputs a print, as history (Step S11). Registered at this time when the print is output as the information on the multifunction peripheral 120 are the IP address and the device name (e.g., host name) identifying the device, for example.

Upon completion of the printing from the multifunction peripheral 120 (Step S12), the multifunction peripheral 120 notifies the LF management server 100 of the printing result (Step S13).

Upon completion of registering the printing result (Step S14), the LF management server 100 deletes the print data (Step S15), and performs a background process of updating the device usage history that is registered for each user (Steps S16 to S17). The process includes updating of the usage history, and taking a tally of the usage count again. This updating process is executed every time the user outputs a print.

Figure 9A:
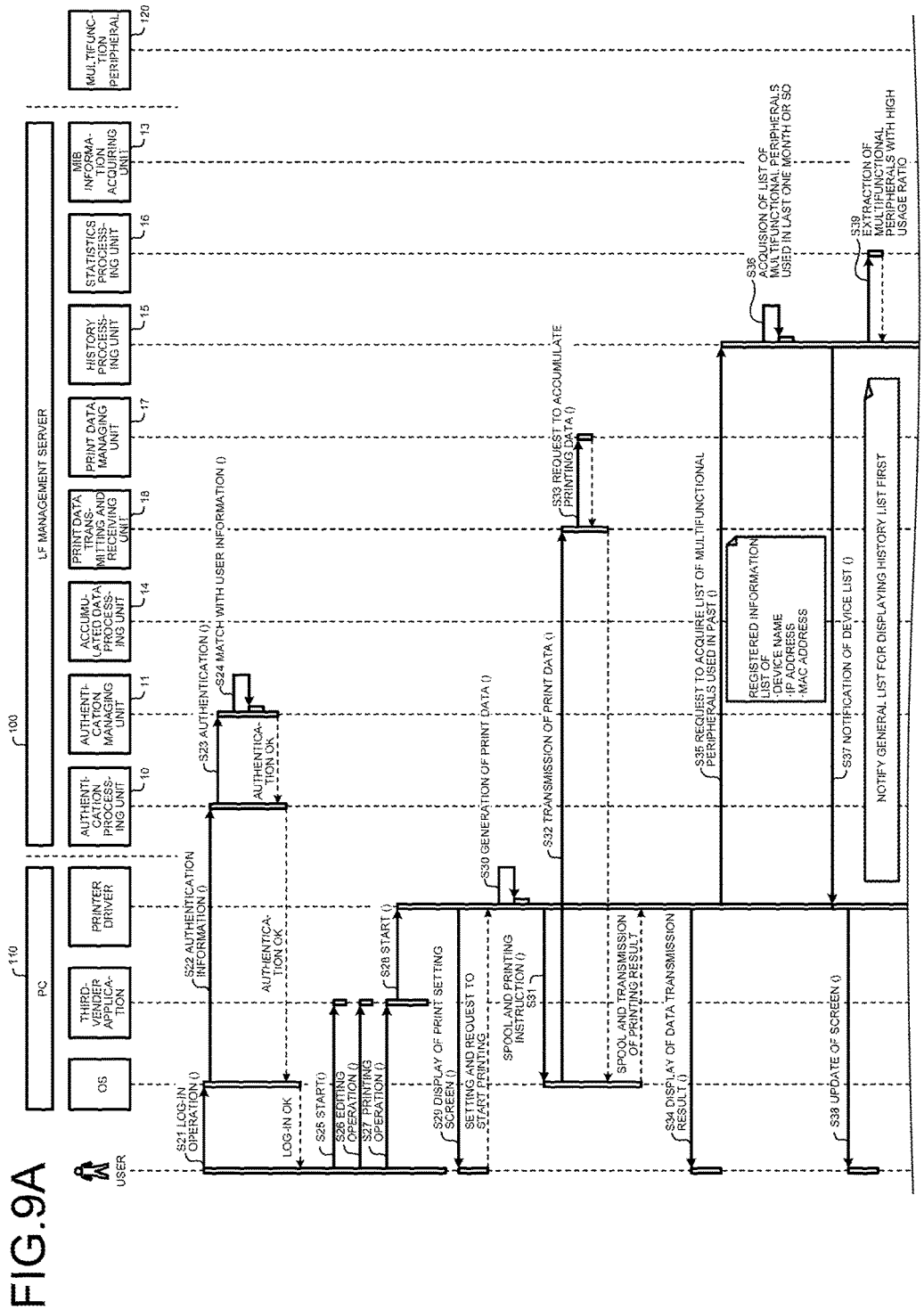
FIG. 9A is a sequence chart illustrating the process in which the user issues a printing request from a PC (printer driver), and a sequence in which the LF management server acquires information from the multifunction peripheral.
Figure 9B:
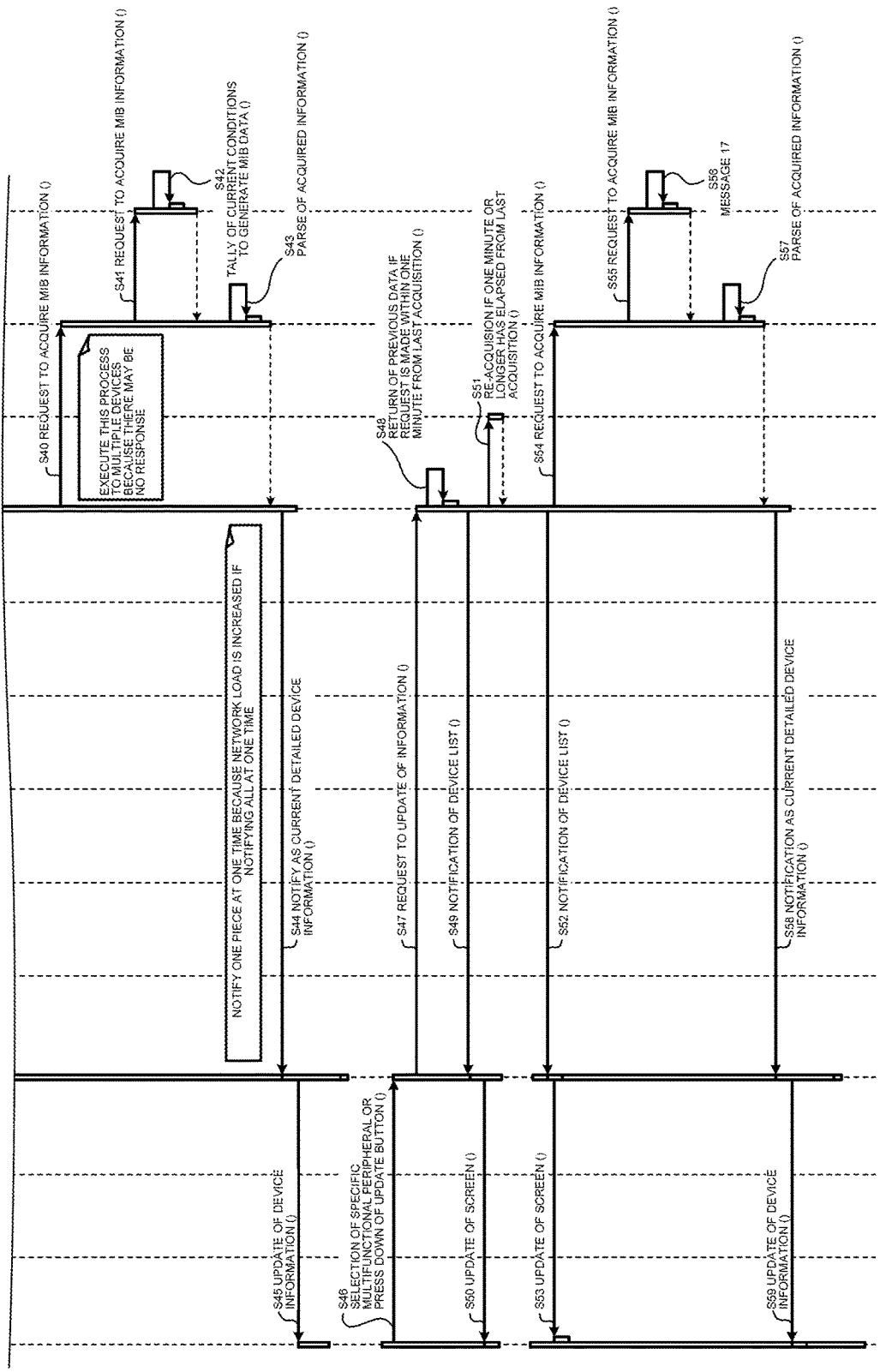
FIG. 9B is another sequence chart illustrating the process in which the user issues a printing request from the PC (printer driver), and the sequence in which the LF management server acquires information from the multifunction peripheral.

FIGS. 9A and 9B are sequence charts illustrating details of the process executed between the printer driver and the LF management server 100 in the sequence in FIG. 8. In FIGS. 9A and 9B, the process before the acquisition of the usage history of the multifunction peripheral 120 is approximately the same as the process in FIG. 8 (Steps S21 to S35).

After receiving a history acquisition request from the printer driver on the PC 110 (Step S36), the LF management server 100 notifies the printer driver of the history information accumulated on the LF management server 100 (Step S37). Consideration is made such that the information notified to the printer driver is divided in units of one month or in units of some data count, for example to ensure that the data transmission amount is equal to or less than a certain level. The history data received by the printer driver is displayed on the GUI (Step S38).

After notifying the printer driver of the history information, the LF management server 100 performs statistical processing on the history information, and extracts some multifunction peripherals 120 with high user usage ratios (Step S39). The LF management server 100 then acquires the MIB information from the multifunction peripherals 120 extracted as a list, and acquires the current conditions of the multifunction peripherals 120, one after another from the multifunction peripheral 120 with the highest usage ratio, and in the descending order of the usage ratio (Steps S40 to S43). The acquired data is notified to the printer driver every time such data is acquired (Step S44), so that the user can recognize the current conditions of the multifunction peripherals 120 (Step S45). The printer driver notifies the LF management server 100 when the user selects a particular multifunction peripheral 120 from the history displayed in the printer driver, together with the information on the selected multifunction peripheral 120, and performs a real-time MIB information acquisition process (Steps S46 to S50). If the MIB information is to be acquired frequently, however, the load in the network 130 would be increased. Therefore, the MIB information acquisition process is executed only after some time (e.g., one minute) has elapsed from when the MIB information was acquired last time. When a request is received at a short time interval, the LF management server 100 will return the MIB information previously acquired (Steps S51 to S59).

FIG. 10 is a schematic view for explaining an exemplary GUI screen of the printer driver on the user PC 110. By issuing a printing instruction from some application such as text editor software, the user can display the GUI screen of the printer driver. The GUI of the printer driver includes a screen for displaying the current conditions of the multifunction peripherals previously used by the user, as well as general printing settings, and can be caused to be displayed by a user at any timing.

When the user displays the screen, the usage history data of the multifunction peripherals 120 having been already acquired at the point in time (the table in the upper area of the GUI screen) is displayed. This displayed usage history data is a list of the multifunction peripherals 120 previously used by the user, and this list can present the usage count, the IP address, and the current reachability status of each of the multifunction peripherals 120. The printer driver acquires the usage history data as a background process from the LF management server 100. If there is any update to the previous data, the printer driver updates the GUI every time such an update is made.

The printer driver also acquires the detailed information on the multifunction peripherals 120 from the LF management server 100 as a background process, and displays the detailed information on the selected multifunction peripheral 120 (e.g., displayed with the color of the background reversed with the color of the characters) in the list displayed in the upper area, in the lower area of the GUI. Because the printer driver also acquires the detailed information on the multifunction peripherals 120 having not been selected as a background process, even when the user selects another multifunction peripheral 120, the printer driver can immediately display the detailed information on the multifunction peripheral 120 in the lower area.

A computer program executed on the information processing system according to the embodiment is provided in a manner embedded in the memory unit 102, 112, for example. The computer program may also be provided in a manner incorporated in a computer-readable recording medium such as a compact disc read-only memory (CD-ROM), a flexible disk (FD), a compact disc recordable (CD-R), and a digital versatile disc (DVD), as a file in an installable or executable format.

Furthermore, the computer program executed in the embodiment may be stored in a computer connected to a network such as the Internet, and may be available for download over the network. Furthermore, the computer program executed in the embodiment may be provided or distributed over a network such as the Internet.

The computer program executed in the embodiment has a modular structure including the units described above. As actual hardware, the CPU (processor) 101, 111 reads the computer program from the memory unit 102, 112 and executes the computer program so that the units described above are loaded onto the main memory, and generated on the main memory.

According to an embodiment, an information processing system, an information processing method, and a recording medium capable of notifying the availability of an image forming apparatus, and improving the efficiency of LF printing can be provided, advantageously.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A management server comprising:
a memory and a processor, the memory containing computer readable code that, when executed by the processor, configures the processor to,
authenticate a user of at least one image forming apparatus based on information on the user from an information processing apparatus,
accumulate print data from the information processing apparatus,
acquire availability information and history information from the at least one image forming apparatus, the availability information indicating whether the at least one image forming apparatus is online and idle, and the history information indicating a tally of past usage of the at least one image forming apparatus by the user,
generate a preferred list of preferred image forming apparatuses from among a plurality of image forming apparatuses connected to the management server based on the availability information and the history information,
acquire device information from the preferred image forming apparatuses,
transmit the device information to the information processing apparatus prior to receiving a printing request to print the accumulated print data such that the user is provided with the device information of the preferred image forming apparatuses prior to executing location-free (LF) printing from a user interface of one of the plurality of image forming apparatuses, and
perform the location-free (LF) printing by transmitting the accumulated print data to the one of the plurality of image forming apparatuses in response to receipt of the printing request from the one of the plurality of image forming apparatuses.

2. The management server according to claim 1, wherein the computer readable code, when executed, further configures the processor to,
continually acquire the history information from the at least one image forming apparatus such that duplicate data among the history information is discarded and not added to the history information, and
extract latest history information from the history information, if a time period from when the history information was last acquired is equal to or greater than a set time period.

3. The management server according to claim 1, wherein the computer readable code, when executed, further configures the processor to,
extract a list of image forming apparatuses that are most frequently used among the at least one image forming apparatus based on the history information.

4. The management server according to claim 3, wherein the computer readable code, when executed, further configures the processor to,
acquire condition information indicating conditions of the image forming apparatuses from top of the list of the image forming apparatuses, in response to the management server receiving a printing request, and
acquire current device information on the image forming apparatuses.

5. The management server according to claim 1, wherein the computer readable code, when executed, further configures the processor to,
record additional history information on a user to the server in response to the user outputting a print from a specific image forming apparatus, so as to enable the history information to be retrieved using at least one of items of a user name, date and time, a device name, and a device reachability status.

6. The management server according to claim 1, wherein the computer readable code, when executed, further configures the processor to,
determine which of the at least one image forming apparatus are most frequently used image forming apparatuses based on the history information, and
extract only device information on reachable ones of the at least one image forming apparatus among the most frequency used image forming apparatuses.

7. The management server according to claim 1, wherein the device information is management information base (MIB) information acquired by the management server from the preferred image forming apparatus and transmitted by the management server to the information processing apparatus.

8. The management server according to claim 1, wherein the device information includes an error condition that has occurred in the image forming apparatuses.

9. The management server according to claim 1, wherein the history information is information holding, for each of the plurality of image forming apparatuses, a number of times the user, who the management server has authenticated, has used the image forming apparatus.

10. The management server according to claim 1, wherein the management server transmits a device list including at least one image forming apparatus that the user, who the management server has authenticated, has used previously, to the information processing apparatus, and then transmits the device information corresponding to the image forming apparatus included in the device list.

11. An information processing method, comprising:
authenticating a user of at least one image forming apparatus based on information on the user from an information processing apparatus;
accumulating print data from the information processing apparatus,
acquiring availability information and history information from the at least one image forming apparatus, the availability-information indicating whether at least one image forming apparatus is online and idle, and the history information indicating a tally of past usage of the at least one image forming apparatus by the user;
generating a preferred list of preferred image forming apparatuses from among a plurality of image forming apparatuses connected to a management server based on the availability information and the history information;
acquiring device information from the preferred image forming apparatuses;
transmitting the device information to the information processing apparatus prior to receiving a printing request to print the accumulated print data such that the user is provided with the device information of the preferred image forming apparatuses prior to executing location-free (LF) printing from a user interface of one of the plurality of image forming apparatuses; and
performing the location-free (LF) printing by transmitting the accumulated print data to the one of the plurality of image forming apparatuses in response to receipt of the printing request from the one of the plurality of image forming apparatuses.

12. A non-transitory recording medium including a computer program causing a computer to perform the information processing method according to claim 11.

13. The method according to claim 11, further comprising:
continually acquiring the history information from the at least one image forming apparatus such that duplicate data among the history information is discarded, and
extracting latest history information from the history information, if a time period from when the history information was last acquired is equal to or greater than a set time period.

14. An information processing system, comprising:
at least one information processing apparatus configured to display device information on a display unit associated therewith;
at least one image forming apparatus configured to transmit a printing request in response to a user executing location-free (LF) printing from a user interface of the image forming apparatus, the printing request fetching accumulated print data; and
a management server configured to manage the at least one image forming apparatus, the server including a memory and a processor, the memory containing computer readable code that, when executed by the processor, configures the processor to,
authenticate a user of the at least one image forming apparatus based on information on the user from an information processing apparatus,
accumulate print data from the information processing apparatus to generate the accumulated print data,
acquire availability information and history information from the at least one image forming apparatus, the availability information indicating whether the at least one image forming apparatus is online and idle, and the history information indicating a tally of past usage of the at least one image forming apparatus by the user, generate a preferred list of preferred image forming apparatuses from among a plurality of image forming apparatuses connected to the management server based on the availability information and the history information, acquire the device information from the preferred image forming apparatuses, transmit the device information to the information processing apparatus prior to receiving a printing request to print the accumulated print data such that the user is provided with the device information of the preferred image forming apparatuses prior to executing location-free (LF) printing from a user interface of one of the plurality of image forming apparatuses, and perform the location-free (LF) printing by transmitting the accumulated print data to the one of the plurality of image forming apparatuses in response to receipt of the printing request from the one of the plurality of image forming apparatuses.

15. The information processing system according to claim 14, wherein the management server is configured to, continually acquire the history information from the at least one image forming apparatus such that duplicate data among the history information is discarded, and extract latest history information from the history information, if a time period from when the history information was last acquired is equal to or greater than a set time period.

* * * * *